United States Patent [19]

Pritchard

[11] Patent Number: 5,042,645
[45] Date of Patent: Aug. 27, 1991

[54] DUAL MOTOR CARGO DRIVE UNIT

[75] Inventor: Robert J. Pritchard, Lansdale, Pa.

[73] Assignee: Teleflex Incorporated, Limerick, Pa.

[21] Appl. No.: 599,503

[22] Filed: Oct. 18, 1990

[51] Int. Cl.$^5$ .............................................. B65G 13/06
[52] U.S. Cl. ................................... 198/782; 198/788; 198/791
[58] Field of Search ....................... 198/782, 791, 788; 414/531, 532, 535; 244/137.1

[56] References Cited

U.S. PATENT DOCUMENTS

| | | | |
|---|---|---|---|
| 2,353,239 | 7/1944 | Horstkotte | 198/782 |
| 2,434,411 | 1/1948 | Johnson | 198/782 |
| 3,698,539 | 10/1972 | Schwarzbeck | 198/782 X |
| 3,737,022 | 6/1973 | DeNeefe et al. | 198/782 |
| 3,899,070 | 8/1975 | Lang | 198/782 |
| 3,958,684 | 5/1976 | Garzelloni | 198/782 |
| 4,697,694 | 10/1987 | Huber | 198/782 |
| 4,792,037 | 12/1988 | Huber | 198/788 |
| 4,836,358 | 6/1989 | Fauth, Sr. et al. | 198/791 X |
| 4,949,837 | 8/1990 | Huber | 198/782 |

Primary Examiner—Joseph E. Valenza
Assistant Examiner—Cheryl L. Gastineau
Attorney, Agent, or Firm—Reising, Ethington, Barnard, Perry & Milton

[57] ABSTRACT

A low profile power drive assembly (10) for conveying articles along a conveyor path includes one cylindrical roller (22) supported on an eccentric shaft (32). A first drive motor (26) and a second drive motor (26') are operatively connected to the roller (22) for synchronously rotating the roller (22). The free state position of the roller (22) is in a lower retracted position. When the first (26) and second (26') drive motors apply simultaneous driving torque to the roller (22), the roller (22) rises vertically to a lifted operative position to engage the underside of an article to be conveyed. A clutch (38) is disposed inside the roller (22) for controlling the upwardly normal force applied to the underside of the article being conveyed. The assembly (10) is disposable within a standard rollerway (12) in a conventional aircraft cargo conveyor system.

28 Claims, 6 Drawing Sheets

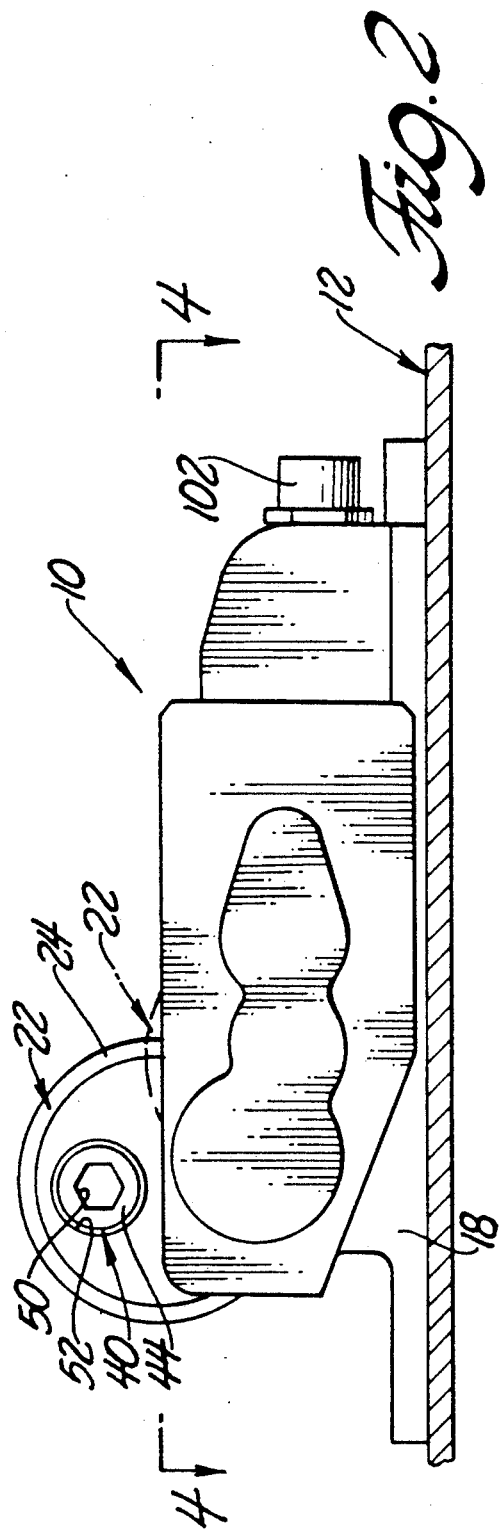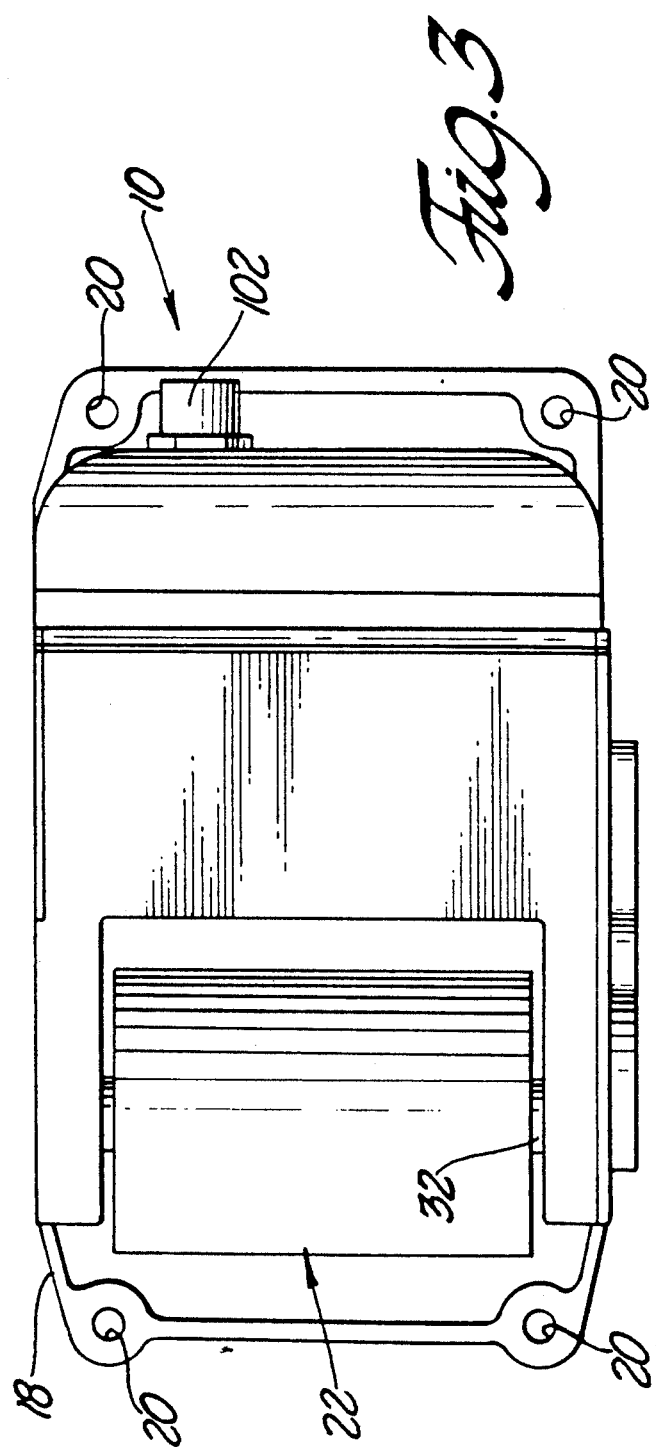

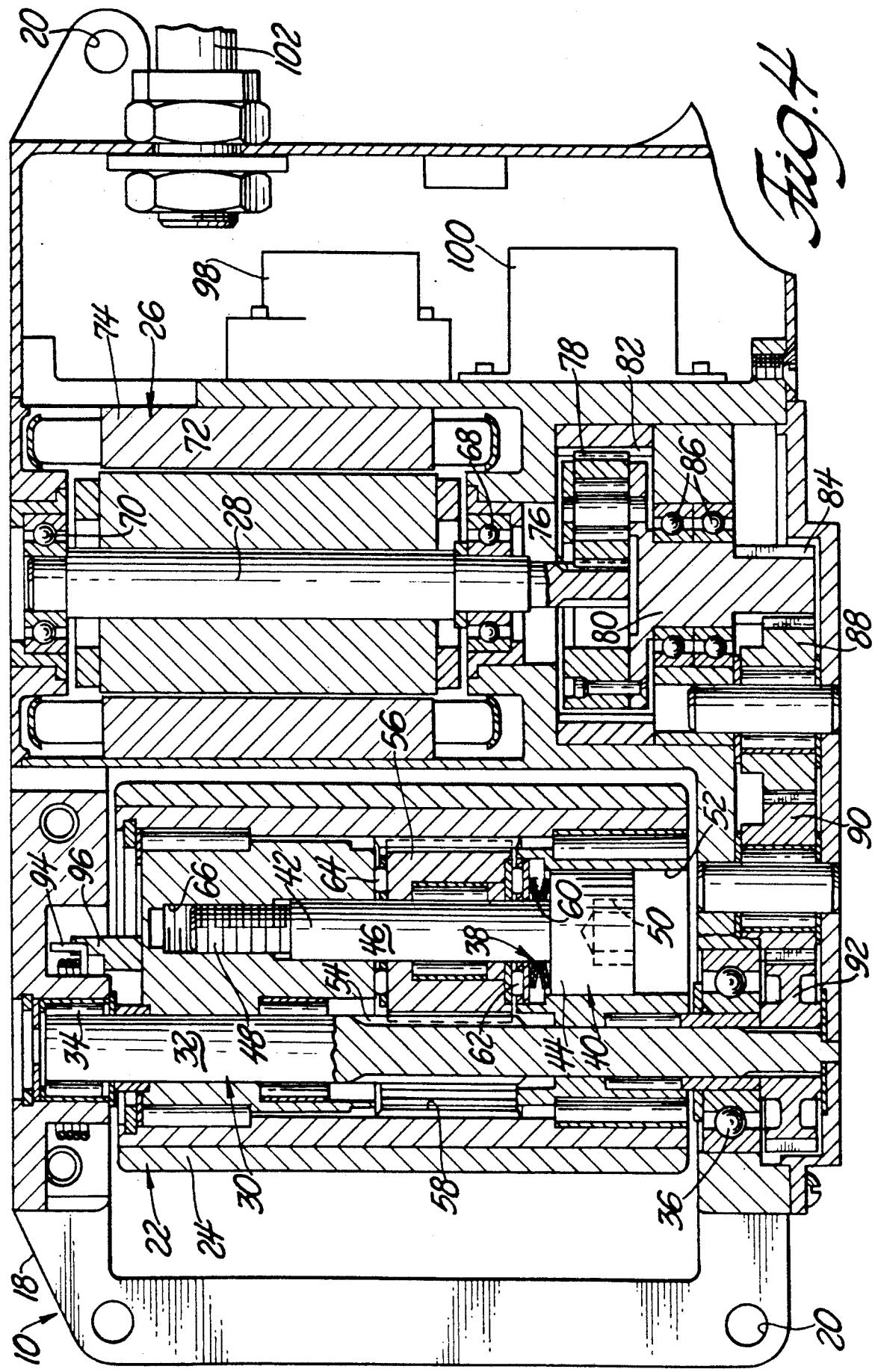

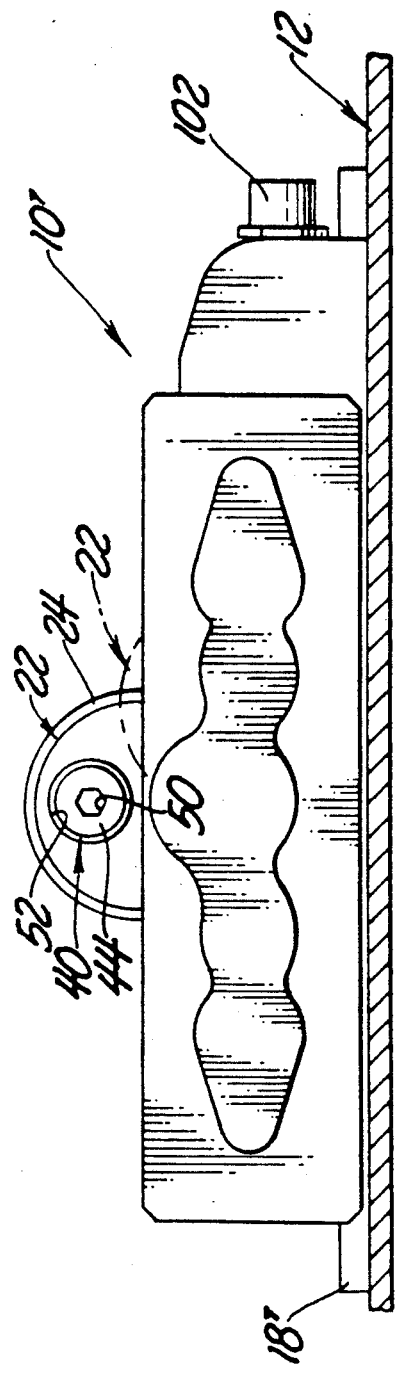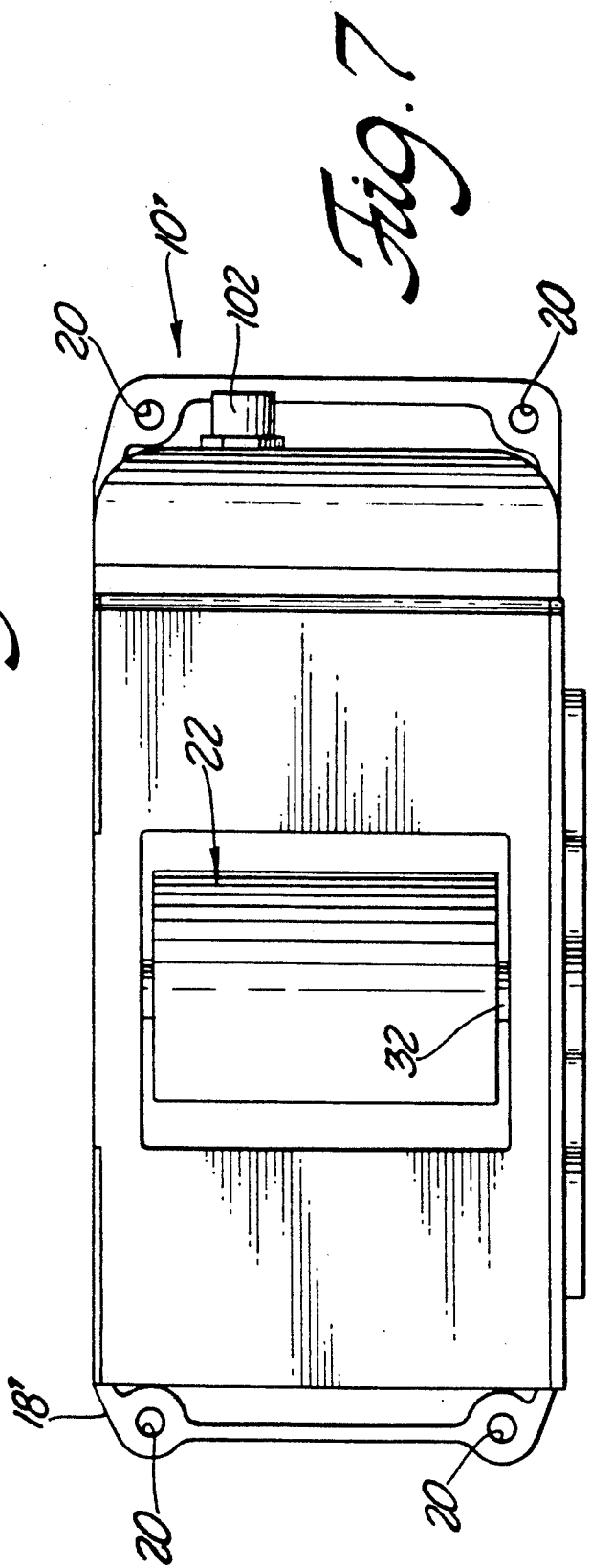

DUAL MOTOR CARGO DRIVE UNIT

TECHNICAL FIELD

The subject invention generally relates to a power driven conveyor section having a live roll with means to adjust the position of the roll relative to the load. More specifically, the subject invention comprises a low profile drive unit operated in connection with a rollerway to accommodate freight on a freight carrier.

BACKGROUND ART

The accommodation of freight on freight carriers, such as aircraft, requires a reliable power driven conveyor system for moving the freight between stored and unstored conditions. In addition to reliability, the conveyor system must be as light weight as possible, and the conveyor system must be as powerful as possible.

With respect to the weight of the conveyor system, it will be readily appreciated that the more cargo which can be loaded on an aircraft, the greater the profit to the carrier. In aircraft cargo shipping in particular, weight capacities of the aircraft must be strictly observed. Once the weight capacity of the aircraft has been reached, no more freight will be loaded into the aircraft even through there is frequently vacant additional space remaining in the cargo area. If the aircraft could be made lighter, e.g., by reducing the weight of the conveyor system, then more freight could be loaded into the vacant additional space in the cargo area. Therefore, a reduction in the weight in the freight conveyor system will allow additional freight to be loaded into the aircraft, and therefore return greater profits to the shipper.

With respect to the power requirements of the conveyor system, as weight is trimmed from various portions of the aircraft, including the conveyor system, the weight of the freight stored in the aircraft may become heavier. Alternatively, on aircraft dedicated or dedicatable to the shipping of cargo, the main deck is available to receive cargo containers which are substantially larger and heavier than containers received into the lower deck cargo area. The heavier the freight moved by the conveyor system, the nearer the individual power drive unit assemblies become taxed to overload. To remedy this problem, the prior art teaches to increase the size, and hence the weight, of the driving motor in the power drive unit assembly. Or, as an alternative, the prior art teaches that more power drive unit assemblies may be used at closer spaced intervals to move the heavier cargo. However, as the size and number, and consequently the weight, of each power drive unit assembly increases, the lighter the total weight of freight which may be received into the cargo area in order to prevent an overload of the aircraft weight capacity.

Therefore, the prior art is deficient and in need of a power drive unit assembly which is both light weight and powerful, while requiring very small space within the aircraft.

SUMMARY OF THE INVENTION AND ADVANTAGES

The subject invention provides a low profile power drive assembly of the type for conveying articles along a conveyor path. The assembly comprises a support member, a solitary roller supported by the support member for independent rotation about a substantially horizontal axis for rollably engaging the underside of an article to be conveyed, and a first drive means operatively connected to the roller for forcibly rotating the roller about the horizontal axis. The invention is characterized by a second drive means spaced from the first drive means and operatively connected to the roller for forcibly rotating the roller about the horizontal axis synchronously with the first drive means to provide increased driving torque to the solitary roller to convey heavy articles along the conveyor path.

The subject invention is unique in that two drive means are provided which synchronously drive the one roller. The first and second drive means are each dedicated to the one solitary roller so that double the driving torque is supplied to the one roller, as compared to the prior art assemblies which include only one drive means per roller. The advantage of the subject invention is that two small drive means can be compactly contained in the support member so as to conserve space within the aircraft while not appreciatably adding to the weight of the conveyor system while providing twice the tractive force. Hence, when compared to the prior art, the subject invention provides a low profile power drive assembly with substantially reduced weight in comparison to the equivalent prior art devices, and hence allows more freight to be loaded onto the aircraft thereby increasing the profitability of the carrier. Further, if one of the drive means should fail during operation, the unit will continue to operate under the power supplied from the remaining drive means.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a front elevation view of the first embodiment of the subject invention;

FIG. 3 is a top view of the first embodiment of the subject invention;

FIG. 4 is a cross-sectional view of the first embodiment of the subject invention as taken substantially along lines 4—4 of FIG. 2;

FIG. 6 is a front view of the second embodiment of the subject invention;

FIG. 7 is a top view of a second embodiment of the subject invention; and

DETAILED DESCRIPTION OF THE FIRST PREFERRED EMBODIMENT OF FIGS. 1-4

Figure 1:
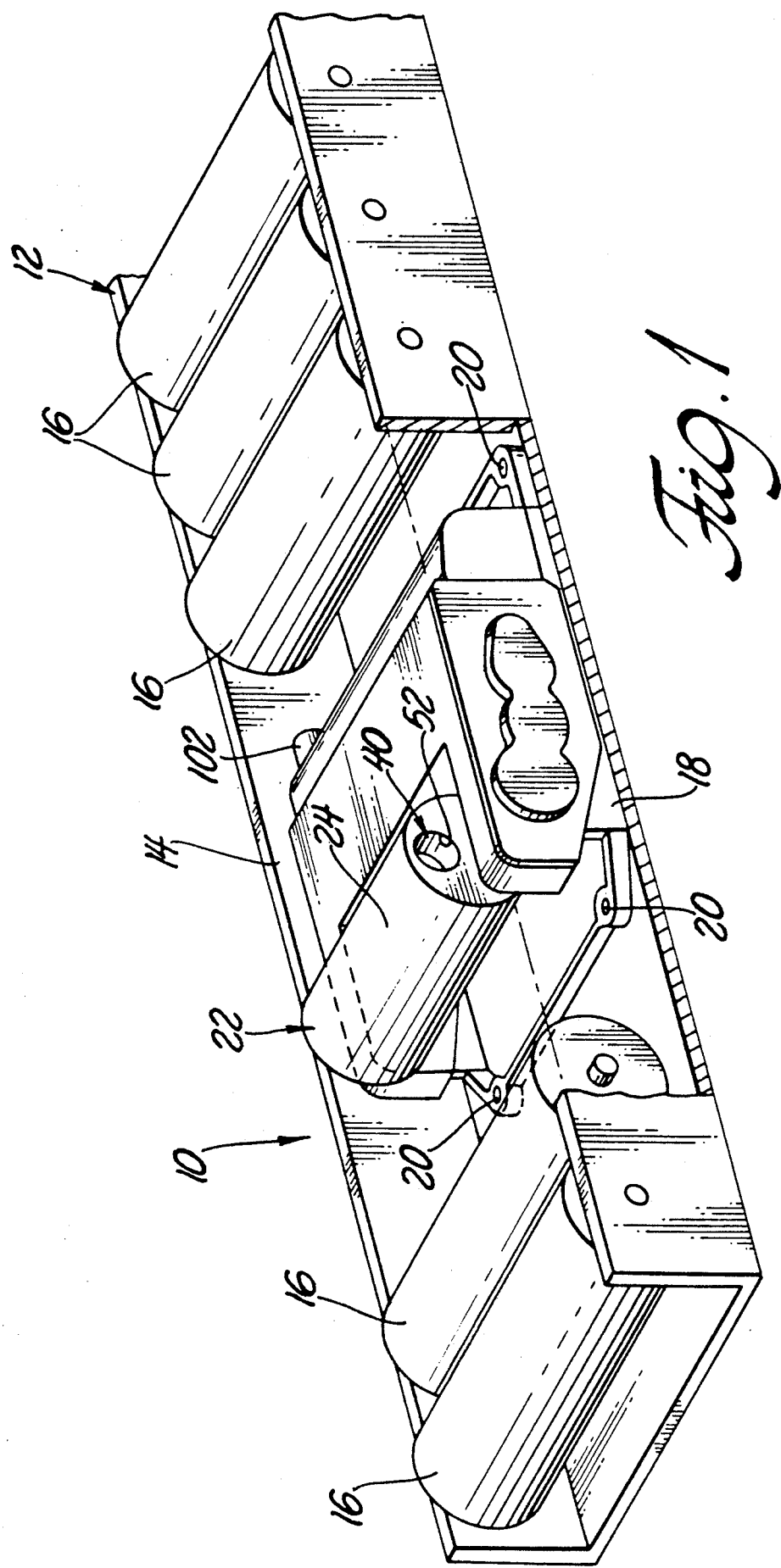
FIG. 1 is a perspective view of a first embodiment of the subject invention disposed in a roller tray.

Referring to the Figures, wherein like numerals indicate like or corresponding parts throughout the several views, a low profile power drive assembly according to the subject invention is generally shown at 10. The assembly 10 is operated in association with a rollerway conveyor system, generally indicated at 12 in FIG. 1. The rollerway 12 includes a U-shaped channel 14 which is typically mounted to the floor of an aircraft, longitudinally along its fuselage. A plurality of cylindrical conveyor wheels 16 are rollably supported crosswise in the channel 14 for rollably supporting an article of freight in the aircraft. Typically, the internal width of the channel 14 is approximately four inches, and the vertical height to the top of the conveyor wheels 16 is approximately two inches. Therefore, in order to fit within the channel 14, the assembly 10 has a width dimension less than four inches.

Referring now to FIGS. 2-4, the assembly 10 is shown including a frame-like support member 18. The support member 18 includes a mounting means for mounting the assembly 10 to a flat subsurface. More particularly, the mounting means comprises four peripheral mounting holes 20. Although not shown in FIG. 1, threaded fasteners are passed through the mounting holes 20 and threadably received in the channel 14 to securely fasten the assembly 10 within the rollerway 12. As such, it will be observed that the assembly 10 is entirely supported above the lower horizontal surface of the channel 14, and therefore does not require the cutting of holes in the floor of the aircraft to provide a recessed mounting.

A solitary roller, generally indicated at 22, is supported by the support member 18 for independent rotation about a substantially horizontal axis for rollably engaging the underside of an article to be conveyed along the rollerway 12. In other words, the assembly 10 includes one single roller 22 for engaging and forcibly displacing the articles to be conveyed along the rollerway 12. As best shown in FIG. 4, the substantially cylindrical roller 22 includes an article engaging exterior surface comprised of a resilient elastomeric exterior shell 24. The shell 24 is preferably fabricated from a tough, high density hard rubber.

A first drive means, generally indicated at 26, is operatively connected to the roller 22 for forcibly rotating the roller 22 about its horizontal axis. The first drive means 26 generally comprises an electric motor having a first drive shaft 28 which is disposed parallel to the horizontal axis of the roller 22. When the assembly 10 is actuated from an external power source, rotation of the first drive shaft 28 ultimately causes rotation of the roller 22 and hence engages and drives the underside of an article of freight along the rollerway 12, as will be described in greater detail subsequently.

Referring now to FIGS. 2 and 4, a lift means, generally indicated at 30, is provided for lifting the roller 22 in the support member 18 laterally upwardly of the horizontal axis of the roller 22 to a lifted operative position. In FIG. 2, the roller 22 is shown in the lifted operative position, and in a retracted inoperative position in phantom. Also, the roller 22 is shown in the lifted operative position in FIG. 1.

When the assembly 10 is disposed in a conventional rollerway 12, the entire assembly 10 rests below the plane formed tangentially along the uppermost portions of the conveyor wheels 16. However, when the lift means 30 is activated, the roller 22 will pop-up to the operative position to engage the under surface of an article of freight and to apply an upwardly normal force against the under surface of the article of freight to establish a frictional contact before driving the article along the rollerway 12. In the event of a power failure, where the first drive means 26 is inoperable to rotate the roller 22, the roller 22 will remain in the lower retracted position so that articles of freight may be moved along the rollerway 12 in a manual manner, i.e., without the aid of the power drive assembly 10.

The lift means 30 includes an eccentric shaft 32 extending axially through the roller 22. The eccentric shaft 32 is spaced from and extends parallel to the horizontal axis of the roller 22. Therefore, the eccentric shaft 32 is laterally offset from the horizontal axis of the roller 22. The eccentric shaft 32 is rotatably supported in the support member 18 at a fixed location by a rearward roller bearing 34 and a forward roller bearing 36. Therefore, the entire roller assembly 22 is supported on the eccentric shaft 32. As will be described in greater detail subsequently, the lifting is accomplished by the roller 22 being rotated about the eccentric shaft 32 to move between the retracted and operative positions.

The lift means 30 includes a clutch, generally indicated at 38, for limiting continued lift of the roller 22 in response to a predetermined counter force acting in the direction opposite to the lift. That is, as the roller 22 rotates from the retracted to the operative position about the eccentric shaft 32, the clutch 38 allows the roller 22 to cease its continued upward movement upon contacting the underside of the article of freight. The weight of the article of freight will provide the necessary downward counterforce to act against the roller 22 and thereby disengage the clutch 38, thus preventing continued upward travel of the roller 22. At the same time, however, the roller 22 continues to exert an upward force on the underside of the article of freight to establish the requisite frictional contact with the article of freight to prevent slippage while driving the article of freight along the rollerway 12.

The clutch 38 includes an adjustment means, generally indicated at 40, for adjusting the responsiveness of the clutch 38 to the predetermined counter force. That is, the adjustment means 40 allows the clutch 38 to be adjusted for disengagement at different reaction forces. Effectively, the adjustment means 40 provides for adjustment in the traction between the roller 22 and the underside of the conveyed article so that if slippage begins to occur due to insufficient traction, the clutch 38 may be adjusted accordingly. In the embodiment shown, the adjustment means 40 includes an axially displacable bolt 42 which is responsive to a rotary input. The bolt 42 includes an enlarged head portion 44 having a generally cylindrical shape. A shank portion 46 extends axially from the head 44. A threaded tip 48 extends from the shank 46. A tool receiving socket 50 is formed in the head 44. Alternatively, interchangeable shims may be used in place of the bolt 42 for providing the adjustable quality of the clutch 38.

The entire clutch assembly 38 is disposed substantially within the roller 22. An access 50 is provided in the end of the roller 22, between the eccentric shaft 32 and the rubber shell 24, to allow unobstructed insertion of a tool in the socket 50. As best shown in FIGS. 1 and 2, the adjustment means 40 of the clutch 38 is easily accessible even when the assembly 10 is mounted within the rollerway 12. Therefore, at any necessary time the adjustment means 40 can be accessed while the unit remains mounted in place in the rollerway 12 and adjustment provided to the clutch 38 in order to maintain optimum performance of the assembly 10.

Referring again to FIG. 4, a reduction input gear train operatively interconnects the eccentric shaft 32 and the roller 22. The reduction gear train is disposed entirely within the roller 22. Midway between the rearward 34 and forward 36 roller bearings, an input sun gear 54 is formed integrally about the eccentric shaft 32. An input planet gear 56 is operatively engaged with the input sun gear 54 such that the two tangentially intermesh as driving and driven gears. An input ring gear 58 is concentrically fixed within the roller 22 and is operatively engaged with the input planet gear 56. Therefore, rotation of the eccentric shaft 32 causes the input sun gear 54 to rotatably drive the input planet gear 56, which in turn meshes with and rotates the input ring gear 58, ultimately rotating the roller 22. In order to conserve space and weight, the shank portion 46 of the bolt 42 is employed as an axel for rotatably supporting the input planet gear 56. Therefore, the bolt 42 forms a part of the planet carrier for the input planet gear 56 and is rotatable within the roller 22 about the eccentric shaft 32.

The clutch 38 includes a biasing means 60 disposed between the head 44 of the bolt 42 and the input planet gear 56. Preferably, the biasing means 60 comprises a plurality of Bellville washers disposed between the head 44 of the bolt 42 and a forward brake roller 62 disposed on the forward end of the input planet gear 56. A rearward brake roller 64 is disposed between the rearward end of the input planet gear 56 and a threaded receptacle portion 66 of the planet carrier. The brake rollers 62, 64 may be supported in a bearing cage whereby the individual needle bearings in each of the brake rollers 62, 64 are arranged at an angle obliquely to the radial direction of the central bolt 42 axis. Therefore, as the bolt 42 is threaded into the receptacle portion 66 of the carrier, the Bellville washers 60 are forcibly compressed against the forward brake roller 62 which applies a compressive force to the input planet gear 56, tending to restrain the input planet gear 56 from rotation about the shank 46. Nonrotation of the input planet gear 56 effectively locks the gear train to prevent relative movement between the input sun gear 54 and the input ring gear 58. Therefore, until the compressive force of the Bellville washers 60 is overcome, rotation of the eccentric shaft 32 causes the roller 22 to rotate between the lifted operative position and the retracted inoperative position.

When an article of freight is disposed over the assembly 10, the eccentric shaft 32 rotates the roller 22 as a unit upward into engagement with the under surface of the article and applies an upward force to the under surface of the article until the compressive force of the Bellville washers 60 is overcome. Once this compressive force is overcome, the input planet gear 56 begins to rotate causing the roller 22 to rotate about its horizontal axis thereby driving the article along the rollerway 12. Therefore, it will be appreciated that the tighter the bolt 42 is threaded into the receptacle portion 66, the greater the compressive force on the input planet gear 56, and hence the greater frictional contact which will be established between the roller 22 and the under surface of the article being conveyed. Rotation of the eccentric shaft 32 is accomplished through an operative connection to the first drive means 26.

The first drive shaft 28 is supported for independent rotation in the support member 18 between a forward bearing 68 and a rearward bearing 70. In typical fashion, the first drive means 26 includes a first rotor 72 fixed concentrically about the first drive shaft 28. The first rotor 72 is disposed in a first stator 74 for rotation upon inducement of a magnetic field therein.

The first drive shaft 28 includes a first drive sun gear 76 fixedly disposed at the end thereof adjacent the forward bearing 68. A first drive planet gear 78 is operatively engaged with the first drive sun gear 76 such that the two are disposed in a tangential meshing relationship. A first drive planet carrier 80 rotatably supports the first drive planet gear 78 in conventionally known fashion. A first drive ring 82 is concentrically disposed about the first sun gear 76 and fixed relative to the support member 18. The first drive ring 82 and the first drive planet gear 78 are disposed in an operatively engaged, intermeshing relationship. Because the first drive ring 82 is fixed relative to the support member 18, the subject gear train comprises a reduction gear system wherein rotation of the first drive shaft 28 causes a substantially reduced rotational velocity of the first drive planet carrier 80.

A first drive pinion gear 84 is formed integrally with the first drive planet carrier 80 and extends axially forwardly from the first drive sun gear 76. The first drive planet carrier 80 and first drive pinion 84 are supported for rotation in the support member 18 by a pair of roller bearings 86.

A first outer idler gear 88 is rotatably supported on the support member 18. The first outer idler gear 88 is operatively engaged with the first drive pinion 84 such that rotation of the first drive pinion 84 causes a corresponding rotation of the first outer idler gear 88. A first inner idler gear 90 is likewise rotatably supported on the support member 88 and operatively engages the first outer idler gear 88. An input gear 92 is fixedly disposed on the distal end of the eccentric shaft 32, adjacent the forward roller bearing 36.

The input gear 92 is in operative engagement with the first inner idler gear 90 thereby completing a continuous gear train from the input ring gear 58 in the roller 82 to the first drive sun gear 76 on the first drive shaft 28. It will, therefore, be appreciated that actuation of the first drive means 26 causes a rotation of the first drive shaft 28 and, through the associated reduction gear train, causes rotation of the eccentric shaft 32. Hence, the eccentric shaft 32 will rotate the roller 22 to the lifted operative position into engagement with the underside of an article of freight and subsequently drive the article along the rollerway 12 when the compressive force of the clutch 38 is overcome.

An anti-lift means 94 is shown in FIG. 4 disposed between the roller 22 and the support member 18 preventing movement of the roller 22 past an extreme lifted operative position. More specifically, the anti-lift means 94 may comprise a helically wound torsion spring acting between the support member 18 and the centrally disposed pin 96 extending from the threaded receptacle portion 66 of the planet carrier, or alternatively a single abutment against which the pin 96 engages.

Formed along one end of the support member 18 is an enclosed space in which is disposed a thermal protector means 98. The thermal protector means 98 automatically disengages the first drive means 26 from its power source in response to a predetermined maximum operating temperature. Also, the thermal protector means 98 will reengage the first drive means 26 to its power source once the operating temperature drops below an acceptable limit. Therefore, if the thermal protector means 98 senses that the first rotor 72 and first stator 74 are becoming overheated from continuous use, the power source will be disengaged so as to prevent damage to the components.

Adjacent the thermal protector means 98 is disposed a relay means 100 for remotely controlling actuation of the first drive means 26. In known fashion, the relay means 100 allows for low power remote actuation of the first drive means 26, while the first drive means 26 is powered from a high power source. A conduit 102 is shown in FIG. 4 passing through a thin walled housing section of the support member 18 to provide a protected passage for electrical wires to the thermal protector means 98 and the relay means 100.

DETAILED DESCRIPTION OF THE SECOND PREFERRED EMBODIMENT OF FIGS. 5-8

Referring to FIGS. 5-8, like or corresponding parts are referenced by the same numerals as used above in connection with FIGS. 1-4 and mirror image elements are referenced with a prime designation. The second preferred embodiment is substantially identical to the invention described in FIGS. 1-4, except that a second drive means 26, is provided. The second drive means 26' is spaced from the first drive means 26 on the opposite side of the roller 22. The second drive means 26'is operatively connected to the roller 22 for forcibly rotating the roller 22 about its horizontal axis synchronously with the first drive means 26 to provide increased driving torque to the solitary roller 22 in order to convey heavy articles along the conveyor path. In other words, as compared to the invention described in FIGS. 1-4, the invention of FIGS. 5-8 provides twice the driving torque to the single roller 22, while adding very little additional weight and requiring very little additional space.

Figure 5:
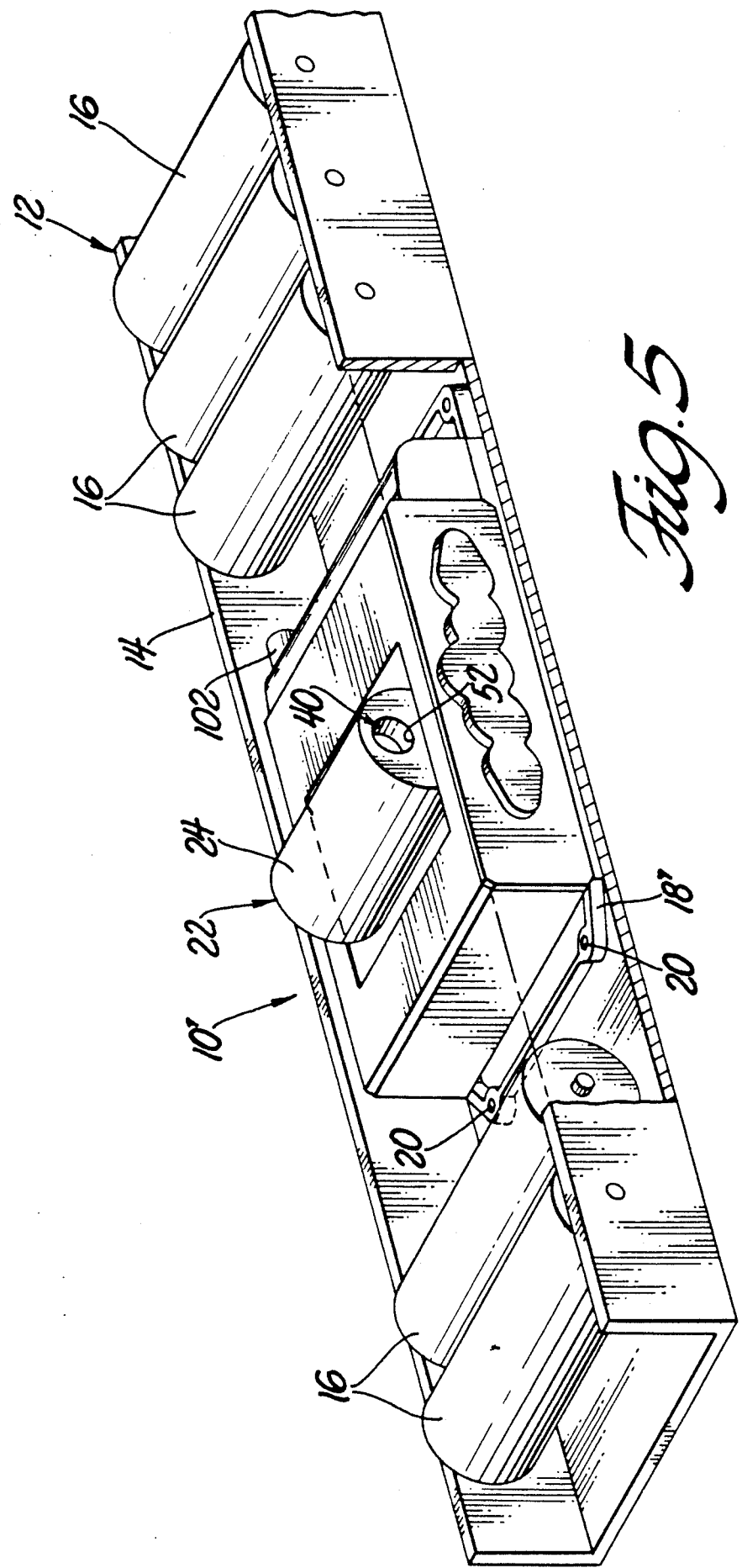
FIG. 5 is a perspective view of a second embodiment of the subject invention disposed in a roller tray.

In FIG. 5, the second preferred embodiment of the assembly 10' is shown disposed in a typical rollerway 12. In FIG. 6, the roller 22 is shown in the lifted operative position, and in phantom at the retracted inoperative position.

Figure 8:
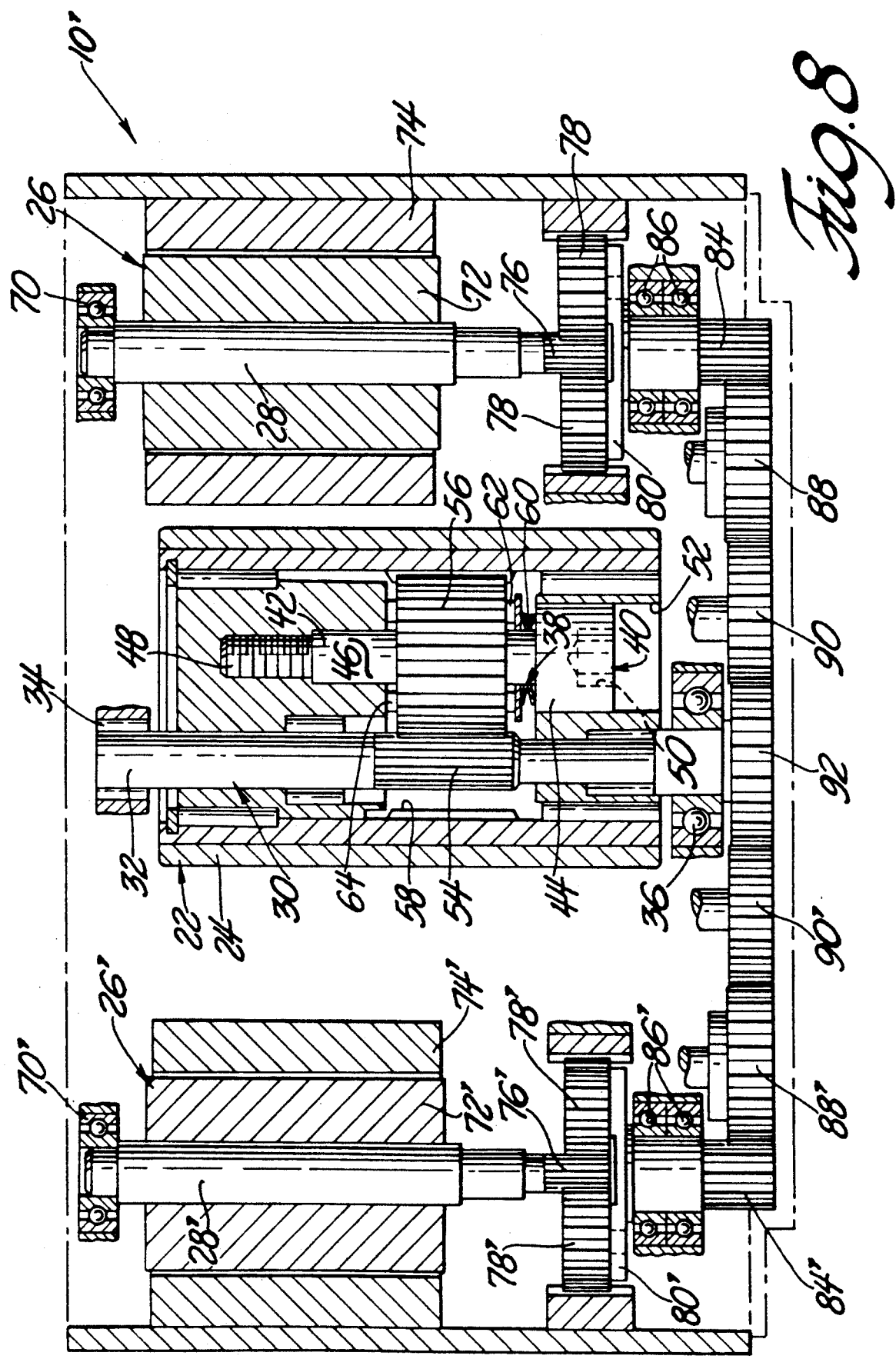
FIG. 8 is a simplified schematic view of the second embodiment of the subject invention.

Referring to FIG. 8, wherein a schematic diagram illustrates the interconnection between the various components, the second drive means 26' is shown including a second drive shaft 28'. The second drive shaft 28, is fixed in a second rotor 72' which, in turn, rotates within a second stator 74'. A second drive sun gear 76, is fixed on the end of the second drive shaft 28'. The second drive sun gear 76' meshes with a second drive planet gear 78' which, in turn, rotates within a second drive ring 82'. A second drive planet carrier 80 rotates with the second drive planet gear 78' in a roller bearing 86' in the support member 18'.

A second drive pinion 84' extends from the second drive planet carrier 80' and meshes with a second outer idler gear 88'. A second inner idler gear 90' operatively engages the second outer idler gear 88'. The second inner idler gear 90' operatively engages and meshes with the input gear 92 disposed on the eccentric shaft 32 to rotate the eccentric shaft 32 as described above. It will be readily appreciated by those skilled in the art that the first drive shaft 28 and the second drive shaft 28' must be rotated in the same direction to simultaneously and uniformly rotate the eccentric shaft 32.

The primary advantage of the second preferred embodiment including the second drive means 26' is that double the tractive force heretofore available for a single roller 22 may be generated in a compact, light weight package. That is, in order to achieve the same driving torque as available in the second preferred embodiment of FIGS. 5-8, the prior art requires two separate power drive assemblies to be mounted end-to-end. However, the second preferred embodiment 10' is substantially lighter in weight than two separate prior art power drive assemblies. Therefore, more driving torque can be delivered to the roller 22 in a smaller and lighter weight assembly 10'. Additionally, the second preferred embodiment is advantageous in that if one of the drive means 28, 28' should fail during operation, the other drive means 28, 28' will remain operative. Therefore, catastrophic failure of the assembly is less probable than in any prior art devices.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A low profile power drive assembly (10') of the type for conveying articles along a conveyor path, said assembly (10') comprising:

a support member (18');

a solitary roller (22) supported by said support member (18') for independent rotation about a substantially horizontal axis for rollably engaging the underside of an article to be conveyed;

first drive means (26) operatively connected to said roller (22) for forcibly rotating said roller (22) about said horizontal axis;

and characterized by second drive means (26') spaced from said first drive means (26) and operatively connected to said roller (22) for forcibly rotating said roller (22) about said horizontal axis synchronously with said first drive means (26) to provide increased driving torque to said solitary roller (22) to convey heavy articles along the conveyor path.

2. An assembly (10') as set forth in claim 1 further characterized by including lift means (30) for lifting said roller (22) in said support member (18') laterally of said horizontal axis to a lifted operative position.

3. An assembly (10') as set forth in claim 2 further characterized by said lift means (30) including an eccentric shaft (32) extending through said roller (22) spaced from and extending parallel to said horizontal axis.

4. An assembly (10') as set forth in claim 3 further characterized by said eccentric shaft (32) being rotatably supported in said support member (18') at a fixed location.

5. An assembly (10') as set forth in claim 4 further characterized by said lift means (30) including a clutch (38) for limiting continued lift of said roller (22) in response to a predetermined counter force acting in a direction opposite to said lift.

6. An assembly (10') as set forth in claim 5 further characterized by said clutch (38) including an adjustment means (40) for adjusting the responsiveness of said clutch to said predetermined counter force.

7. An assembly (10') as set forth in claim 6 further characterized by said clutch (38) being disposed substantially within said roller (22).

8. An assembly (10') as set forth in claim 7 further characterized by said roller (22) including unobstructed access to said adjustment means (40) of said clutch (38).

9. An assembly (10') as set forth in claim 8 further characterized by said adjustment means (40) including an axially displacable bolt (42) responsive to rotary input.

10. An assembly (10') as set forth in claim 9 further characterized by said eccentric shaft (32) being operatively connected to each of said first drive means (26) and said second drive means (26').

11. An assembly (10') as set forth in claim 10 further characterized by including a reduction input gear train operatively interconnecting said eccentric shaft (32) and said roller (22).

12. An assembly (10') as set forth in claim 11 wherein said eccentric shaft (32) includes an input sun gear (54), further characterized by said input gear train including an input planet gear (56) operatively engaged with said input sun gear (54) and an input ring gear (58) concentrically fixed to said roller (22) and operatively engaged with said input planet gear (56).

13. An assembly (10') as set forth in claim 12 wherein said input sun gear (54) and said input gear train are disposed substantially within said roller (22), further characterized by said bolt (42) of said adjustment means (40) rotatably supporting said input planet gear (56).

14. An assembly (10') as set forth in claim 13 further characterized by said clutch (38) including biasing means (60) disposed between said bolt (42) and said input planet gear (56).

15. An assembly (10') as set forth in claim 14 further characterized by said first drive means (26) including a first drive shaft (28) disposed parallel to said horizontal axis of said roller (22) and said second drive means (26') including a second drive shaft (28') disposed parallel to said horizontal axis.

16. An assembly (10') as set forth in claim 15 further characterized by said first drive shaft (28) and said second drive shaft (28') each supported for independent rotation in said support member (18).

17. An assembly (10') as set forth in claim 15 further characterized by said first drive shaft (28) including a first drive sun gear (76) fixedly disposed at one end thereof and said second drive shaft (28') including a second drive sun gear (76') fixedly disposed at one end thereof.

18. An assembly (10') as set forth in claim 17 further characterized by said first drive means (26) including a first drive planet gear (78) operatively engaged with said first drive sun gear (76) and a first drive ring gear (82) concentrically disposed about said first sun gear (76) and fixed relative to said support member (18') and operatively engaged with said first drive planet gear (78), and said second drive means (26') including a second drive planet gear (78') operatively engaged with said second drive sun gear (76') and a second drive ring gear (82') concentrically disposed about said second sun gear (76') and fixed relative to said support member (18') and operatively engage with said second drive planet gear (78).

19. An assembly as set forth in claim 18 wherein said first drive means (26) includes a first drive planet carrier (80) rotatably supporting said first drive planet gear (78) and said second drive means (26') includes a second drive planet carrier (80') rotatably supporting said second drive planet gear (78'), further characterized by said first drive planet carrier (80) including an integral first drive pinion gear (84) extending axially from said first drive sun gear (76), and said second drive planet carrier (80') including an integral second drive pinion gear (84') extending axially from said second drive sun gear (76').

20. An assembly (10') as set forth in claim 19 further characterized by said first drive means (26) including a first outer idler gear (88) rotatably supported on said support member (18) and operatively engaged with said first drive pinion gear (84), and said second drive means (26') including a second outer idler gear (88') rotatably supported on said support member (18') and operatively engaged with said second drive pinion gear (84').

21. An assembly (10') as set forth in claim 20 further characterized by said first drive means (26) including a first inner idler gear (90) rotatably supported on said support member (18) and operatively engaged with said first outer idler gear (88), and said second drive means (26') including a second inner idler gear (90') rotatably supported on said support member (18') and operatively engaged with said second outer idler gear (88).

22. An assembly (10') as set forth in claim 21 further characterized by including an input gear (92) fixedly disposed on said eccentric shaft (32) and simultaneously operatively engaged with said first (90) and said second (90') inner idler gears.

23. An assembly (10') as set forth in claim 22 further characterized by said roller (22) having a substantially cylindrical article engaging exterior surface.

24. An assembly (10') as set forth in claim 23 further characterized by said roller (22) including a resilient elastomeric exterior shell (24).

25. An assembly (10') as set forth in claim 24 further characterized by said support member (18') including mounting means (20) for mounting said assembly (10') to a flat subsurface.

26. An assembly (10') as set forth in claim 25 further characterized by including thermal protector means (98) for automatically disengaging said first (26) and said second (26') drive means from a power source in response to a predetermined maximum operating temperature.

27. An assembly (10') as set forth in claim 26 further characterized by including relay means (100) for remotely controlling said first drive means (26) and said second drive means (26').

28. A low profile power drive assembly (10') of the type for conveying articles along a conveyor path, said assembly (10') comprising:
 a support member (18');
 a cylindrical roller (22) rotatably supported in said support member (18);
 a first drive motor (26) disposed in said support member (18');
 a second drive motor (26') disposed in said support member (18');
 a gear train operatively connecting said first drive motor (26) to said roller (22) and said second drive motor (26') to said roller (22);
 and a clutch (38) disposed in said roller (22).

* * * * *